(12) United States Patent
Bowman

(10) Patent No.: US 9,938,174 B2
(45) Date of Patent: Apr. 10, 2018

(54) ALGAE TURF PLATE SCRUBBER

(71) Applicant: Jason Bowman, Butler, PA (US)

(72) Inventor: Jason Bowman, Butler, PA (US)

( * ) Notice: Subject to any disclaimer, the term of this patent is extended or adjusted under 35 U.S.C. 154(b) by 0 days.

(21) Appl. No.: 15/236,816

(22) Filed: Aug. 15, 2016

(65) Prior Publication Data

US 2018/0044212 A1 Feb. 15, 2018

(51) Int. Cl.
*C02F 3/32* (2006.01)

(52) U.S. Cl.
CPC .................... *C02F 3/322* (2013.01)

(58) Field of Classification Search
CPC ........................................................ C02F 3/322
USPC ................. 210/602, 915, 903, 906
See application file for complete search history.

(56) References Cited

U.S. PATENT DOCUMENTS

| | | |
|---|---|---|
| 3,645,040 A | 2/1972 | Ort |
| 3,661,262 A | 5/1972 | Sanders |
| 3,760,767 A | 9/1973 | Hickey |
| 3,763,824 A | 10/1973 | Schoon |
| 3,768,200 A | 10/1973 | Klock |
| 3,780,471 A | 12/1973 | Ort |
| 4,333,263 A | 6/1982 | Adey |
| 4,966,096 A | 10/1990 | Adey |
| 5,851,398 A | 12/1998 | Adey |
| 7,736,508 B2 | 6/2010 | Limcaco |
| 7,985,338 B1 | 7/2011 | Chong |
| 8,778,184 B2 | 7/2014 | Byrd |
| 8,859,989 B2 | 10/2014 | From |
| 9,115,008 B2 | 8/2015 | Farrish |
| 9,162,909 B2 | 10/2015 | Gencer |
| 2008/0135475 A1* | 6/2008 | Limcaco ................. C02F 3/082 210/602 |
| 2013/0037466 A1* | 2/2013 | Schreiber ................. C02F 3/08 210/150 |
| 2013/0233779 A1* | 9/2013 | Farrish ................... A01G 33/00 210/150 |
| 2014/0284271 A1 | 9/2014 | Kassebaum |
| 2015/0034539 A1 | 2/2015 | Farrish |
| 2015/0329395 A1 | 11/2015 | Murray |
| 2016/0122217 A1 | 5/2016 | Barnard |

OTHER PUBLICATIONS

Algae Based Water Treatment Systems—Cost-Effective Nutrient Pollution Control and for Print and Nonpoint Source Applications, Slide Presentation, HydroMetia Water Treatment Technologies, Feb. 16, 2010.

(Continued)

*Primary Examiner* — Fred Prince
(74) *Attorney, Agent, or Firm* — Michael B. Fein; Eckert Seamans Cherin & Mellott, LLC

(57) ABSTRACT

An apparatus and method for the biological treatment of water using algae comprising a support frame for flat, two-sided LED lighting-panels and flat, two-sided algae turf plates, an axle, the flat, two-sided LED lighting panels and flat algae turf plates are arranged as spokes radiating from the axle in an alternating panel so that each side of each two-sided lighting panel faces and illuminates a side of a flat algae turf plate, the algae turf plates being removable from the support frame so that the collected algae can be removed from each side of each the algae turf plate.

4 Claims, 10 Drawing Sheets

(56) References Cited

OTHER PUBLICATIONS

Thomas, New county water project good for lagoon south of 17th Street bridge, news article, Nov. 16, 2012, 3 pages, VeroNews.com, Indian River County, FL.
Management of Pine Lake Water Quality, Report, May 2009, Tetra Tech Inc., Seattle, WA.
Algal Turf Scrubber Mobile Pilot Unit, Sales Brochure, HydroMentia Water Treatment Technologies, 1 page, Ocala, FL.

* cited by examiner

ALGAE TURF PLATE SCRUBBER

BACKGROUND OF THE INVENTION

The present invention is in the field of apparatus for the biological treatment of bodies of water, specifically through the use of algae. Available apparatus and systems for the use of algae to treat lakes and streams include large photobioreactor growth tanks with secondary collection systems which use multi-stage processes and large scale, open surface algae turf scrubbers. Such systems and apparatus are very large and costly and have a negative impact on surrounding, non-aquatic wildlife. Filter systems exist but are disadvantageous because they become clogged, quickly decreasing the efficiency of the system and need to be replaced, increasing the cost of operation. The size and cost of these systems present an impediment to the installation and use of these systems. There is a need for a more compact, space saving, and affordable design which lessens the impact on wildlife habitat and presents wider financial accessibility to the reduction of non-point pollution in bodies of water.

SUMMARY OF THE INVENTION

The apparatus of the invention meets that need and comprises an assembly which can be inserted into sealable, commercially available tanks. In another aspect, the invention comprises a tank in which that assembly is inserted. The assembly of the invention comprises algae turf plates which are constructed within rigid, near-neutrally buoyant frames and supports with each plate being illuminated by a fixed, thin profile lighting-array on either side. The assembly is arranged with turf plate and lighting panel in an alternating configuration so that when in the closed/operating mode, the algae turf plates are illuminated on both sides. Each plate and panel is arranged radially from a central support so that they are almost parallel to each other, similar to spokes in a wheel when viewed in cross-section. The frame and assembly of the insert are intended to be adaptable to various tank sizes and shapes.

In some embodiments the assembly comprises a framework that can be utilized in the vertical or horizontal position, supporting the wall structure of the housing tank, thin profile lighting-panels which emit light from both sides of the panels, and having slots for receiving the algae turf plates. The lighting-panels direct water flow over the algae turf plate panels. The lighting-panels have two lit sides and the algae turf plate panels have two algae turf growth sides. The lighting-panels and algae turf plates are arranged radially from a central support in a panel-turf plate-panel-turf plate alternating arrangement so that each side of each lighting-panel faces a side of an algae turf plate and each algae turf plate is illuminated on each side.

In operation the assembly is placed in the tank, the tank is then filled with water from the lake or stream water which is to be treated, so that the entire assembly is situated below the water level of the tank, and the tank is sealed. The turf plates can be cleared in different ways, depending on the embodiment. In some embodiments the tank is opened and the assembly may be rotated so that technicians can access the plates and clear them of algae, and in other embodiments the plates can be removed from the assembly, one at a time or the entire assembly can be removed from the tank to allow access to the plates for cleaning and removal of algae.

After removal of the algae, the algae turf plate assembly is re-immersed into the water of the tank.

The system, in operation, is closed with respect to the surrounding environment and atmosphere, and at or near hydrostatic equilibrium, so that lake or stream water is circulated by either siphon or a single pump, depending on the location's application requirements.

Advantages of the invention versus traditional large algae scrubber systems is its smaller overall footprint, lessening the initial negative impacts on local flora and fauna, and substantially lower costs related to set-up and operation than existing algae turf scrubber configurations. These cost-to-consumer savings are found in reduced construction project due to the absence of a need for large installation site construction. The tank is placed in a clearing/pad by the open body of water and the intake and discharge hoses/pipes leading to and from the intake and discharge pipes of the tank are placed into the body of water. Operational costs are reduced by the use of recent improvements in LED lighting technology and the use of an enclosed system through which the water flows from the body of water to be treated, over the algae turf plates, and is returned to the body of water. Because the system discharge is located in close elevation to the system intake relative to the body of water, this reduces the required head-lift needed so that a single low-wattage pump on the intake hose/pipe will operate the entire system to move thousands of gallons over the algae turf plate scrubber per day.

The system uses algae turf plates to remove pollutants including, but not limited to, nitrates, phosphates, effluent, $CO_2$, and some metals from open bodies of water. The turf plates are easily cleaned, algae is harvested at site, and the algae turf plates are re-used rather than replaced.

BRIEF DESCRIPTION OF THE DRAWINGS

One embodiment of the invention is illustrated in the following drawings.

DETAILED DESCRIPTION OF THE INVENTION

Figure 1:
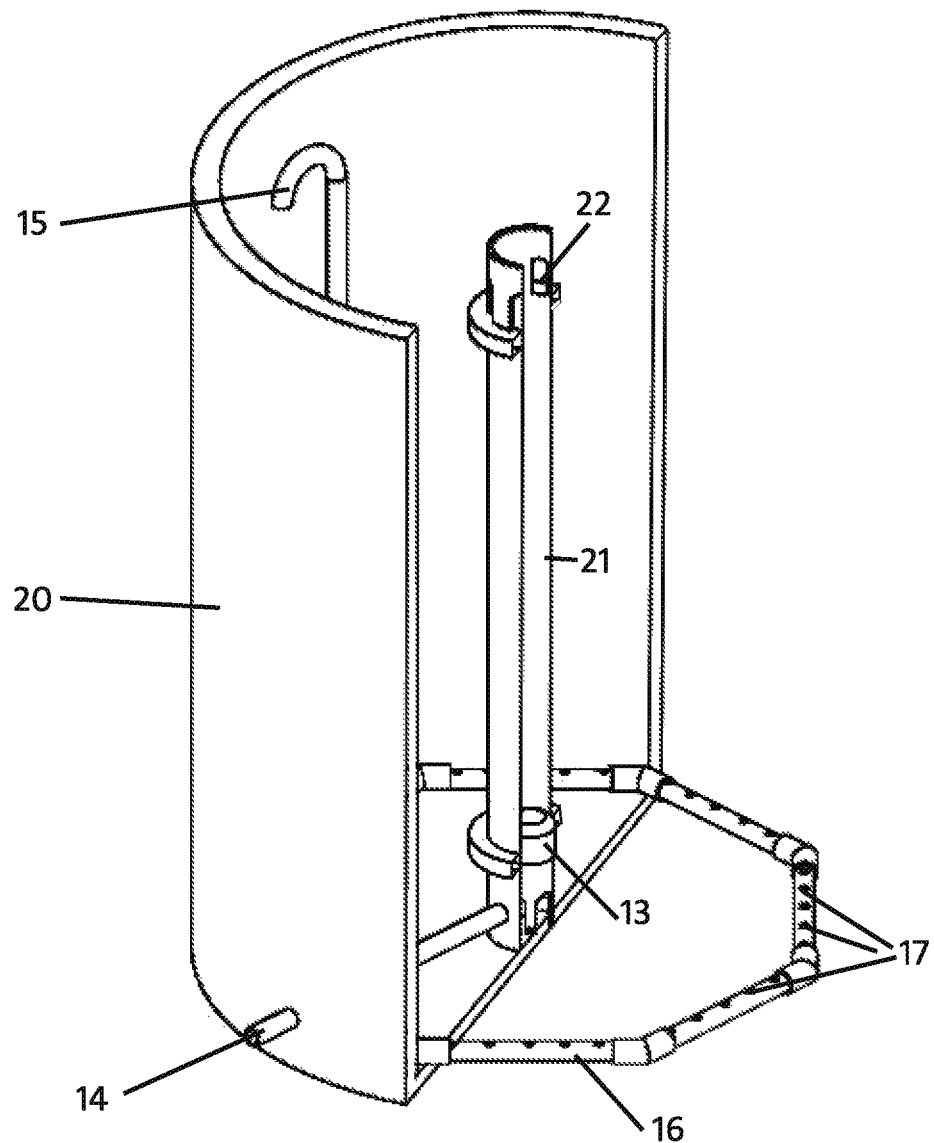
FIG. 1 is a perspective view of the tank and the water directional flow control portions of the frame apparatus.

Referring now to the drawings which illustrate one embodiment, FIG. 1 shows a tank 20 in which lake or stream water is drawn into the tank 20 through the intake pipe 15, being directed to the base of the tank 20 by the intake flow chamber 16. Water is introduced into the tank 20 around the perimeter of the base of the tank 20 through the intake flow chamber inlets 17. Water flows into the tank 20 from the intake pipe 15 to fill the tank 20 from the bottom of the tank 20 to the water surface level as water from the surface level is drawn into the discharge penstock support axle 21 through the discharge penstock support axle inlets 22. The water exits via the discharge bell siphon assembly 13 through the discharge pipe 14.

Figure 2:
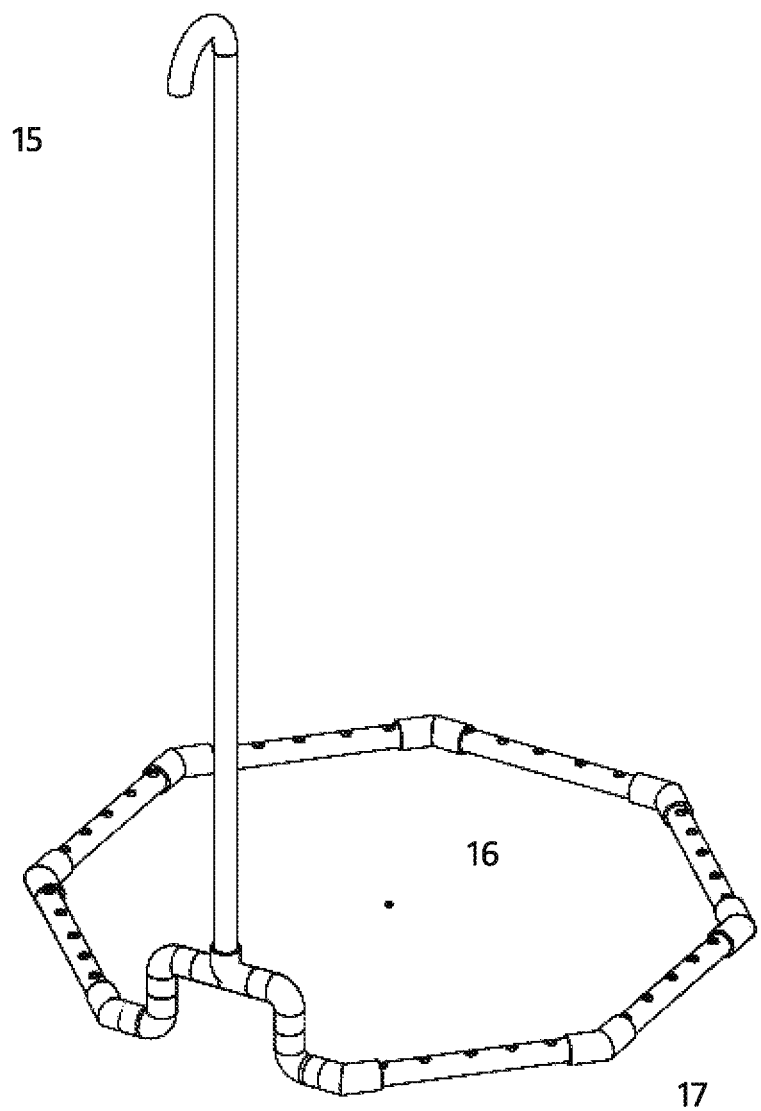
FIG. 2 is a view of the intake pipe and tank perimeter water inlet chamber.

FIG. 2 is a diagram that shows the intake pipe 15, intake flow chamber 16 and intake flow chamber inlets 17 as they are situated in the tank. The intake flow chamber 16 directs water around the perimeter of the base of the tank. The water is introduced into the tank at the base of the tank through the intake flow chamber inlets 17. The intake flow chamber inlets 17 around the circumference of the intake flow chamber 16 distribute water into the tank more evenly than a single inlet.

Figure 3:
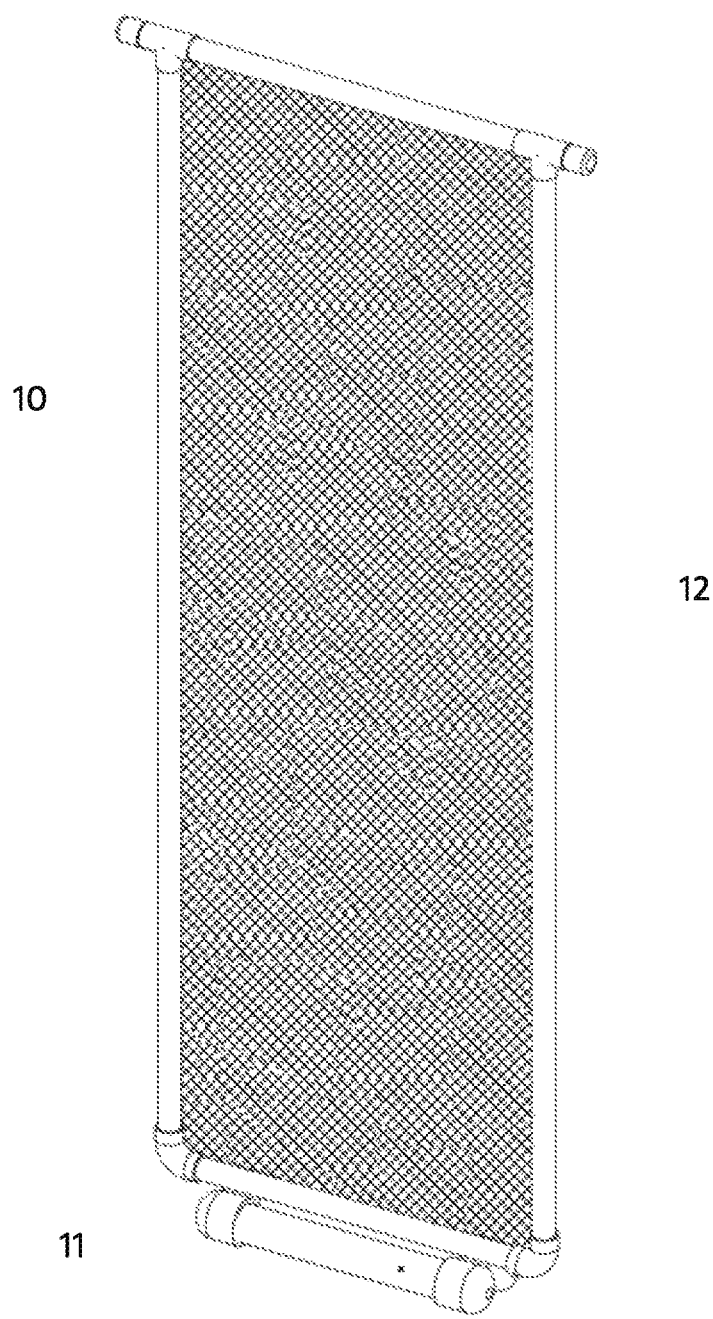
FIG. 3 is a view of the algae turf scrubber plate rigid, near-neutral buoyant frame.

FIG. 3 shows the algae turf plate 10, algae turf plate rigid frame 12 and frame buoyancy pontoon 11. At the bottom of the frame 12 are the pontoons 11, which along with the hollow tube design of the frame 12 provide near-neutral buoyancy to the algae turf plates 10. The neutral buoyancy of the frame 12 eliminates the need for springs or other mechanisms to assist in lifting the frame 12 out of the water in order to clean off the algae turf plates 10 of excess algae growth.

Figure 4:
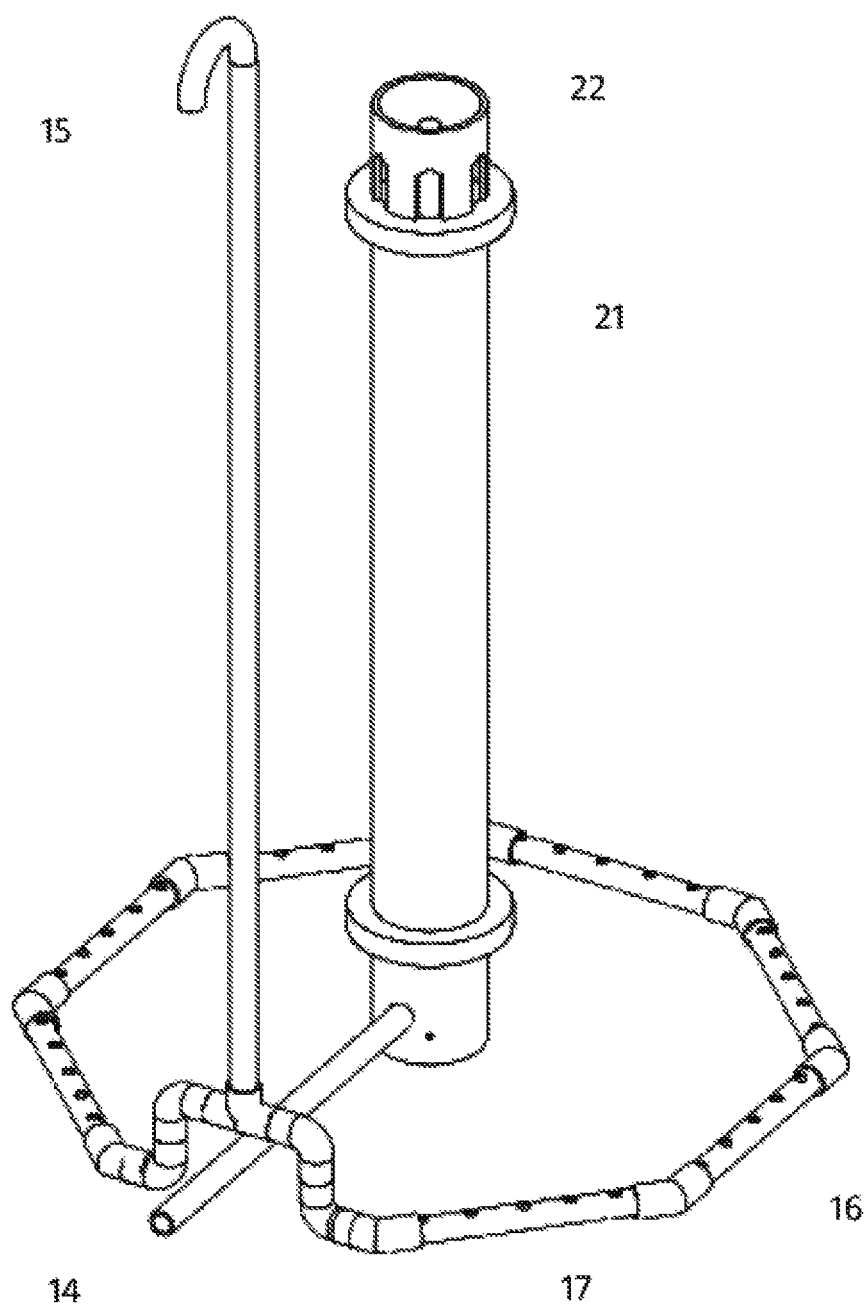
FIG. 4 is a perspective view of the central axle, intake and outflow tubes.

FIG. 4 illustrates the intake pipe 15, intake flow chamber 16, intake flow chamber inlets 17, discharge penstock support axle 21, and discharge pipe 14 more clearly. Water is directed around the perimeter of the base of the tank by the intake flow chamber 17. Water flows in from the intake pipe 15 to fill the tank from the bottom of the tank and up to the water surface level which is located above the discharge penstock support axle inlets 22. As water from the surface level is drawn into the discharge penstock support axle 21 through the discharge penstock support axle inlets 22 the water exits via the discharge bell siphon assembly through the discharge pipe 14.

Figure 5:
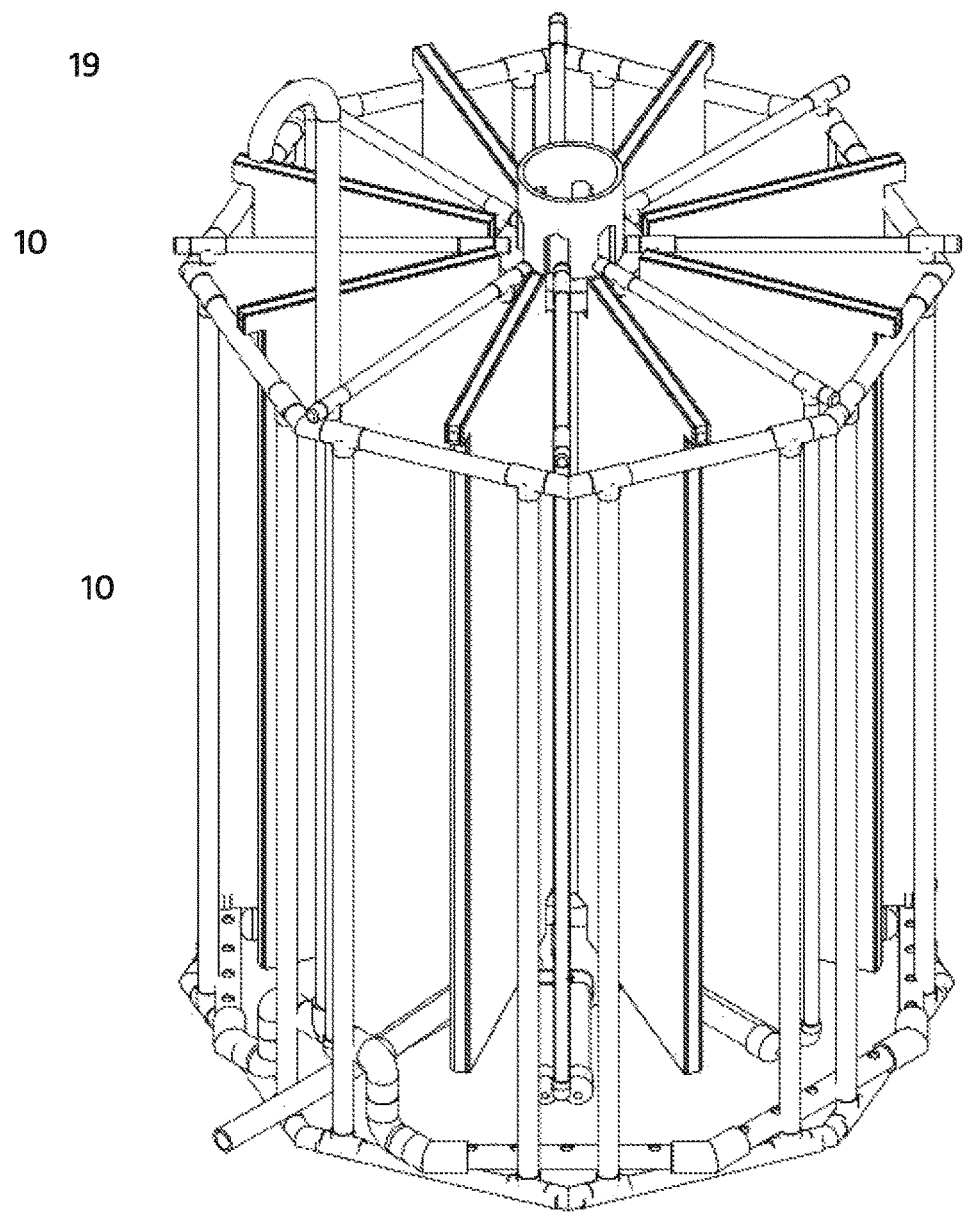
FIG. 5 is a side perspective view of the frame assembly, intake and outflow tubing, LED lighting panels, and algae turf plates.

FIG. 5 shows the assembly including the support frame 24 supporting algae turf plates 10 and LED lighting-panels 19 in an alternating spoke arrangement extending from the central axis.

Figure 6:
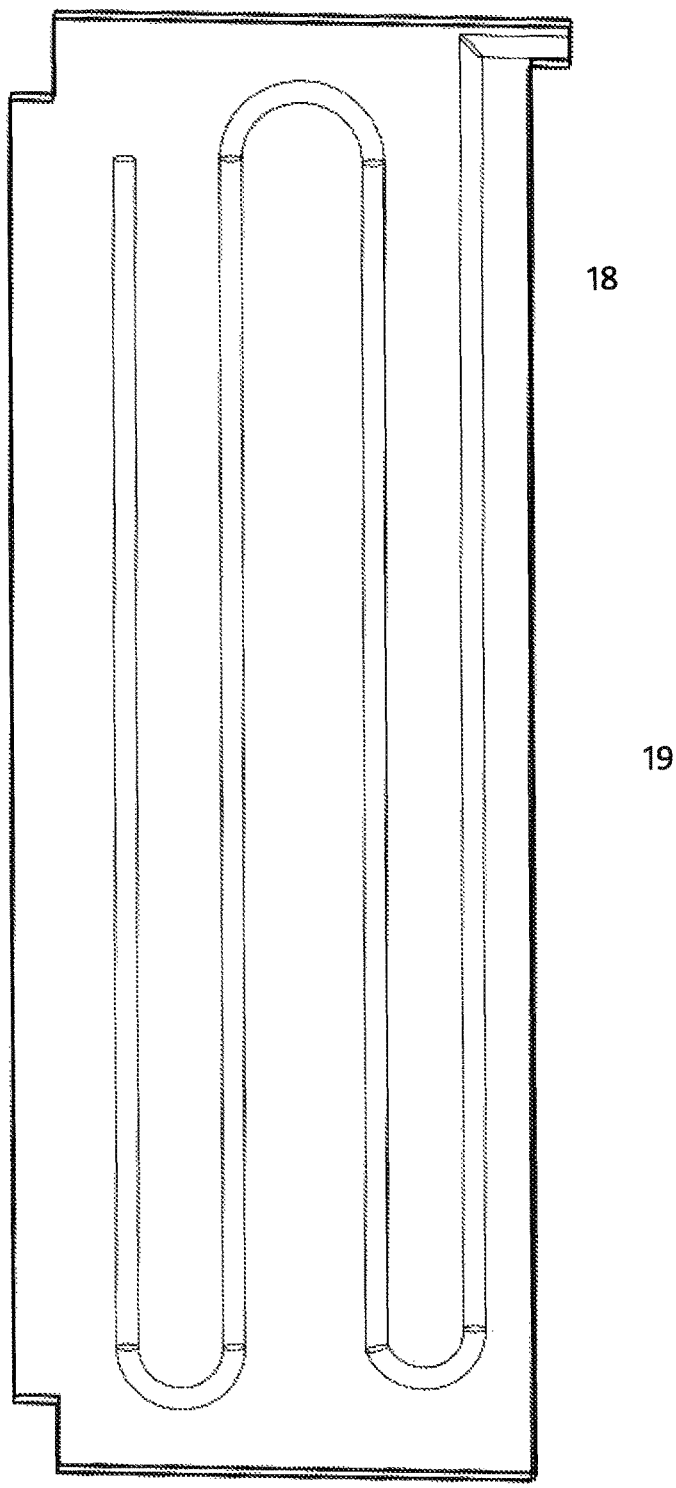
FIG. 6 is a view of the thin profile lighting-panel.

FIG. 6 shows the lighting panel assembly 19 and the enclosed lighting-panel LED lamp winding 18.

Figure 7:
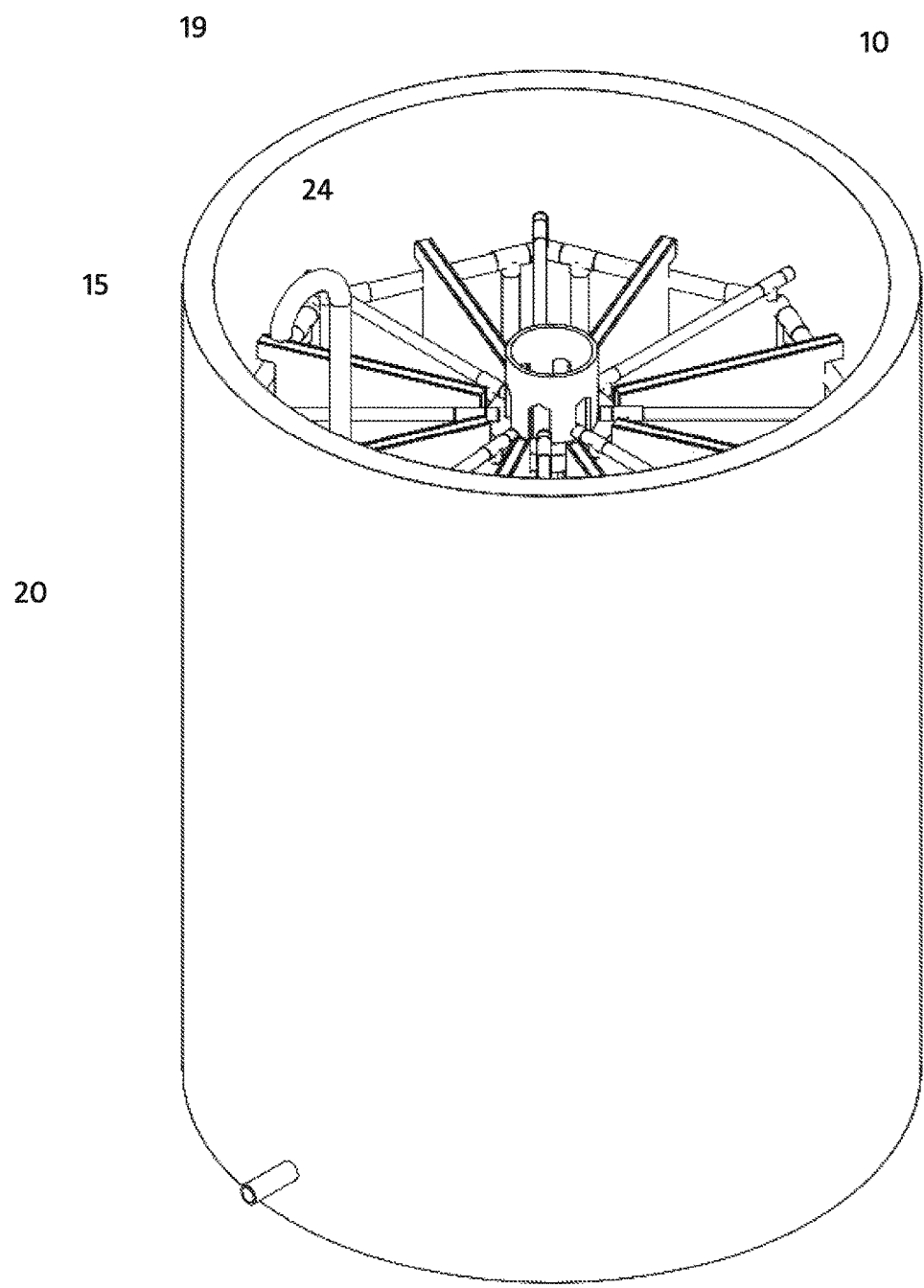
FIG. 7 is a perspective view of the top of the tank, showing the top of the frame assembly.

FIG. 7 shows the assembly comprising the assembly support frame 24, lighting panels 19, and algae turf plates 10 inserted in a tank 20. The intake pipe 15 is shown to illustrate the entire assembly situated on the discharge side and below the crest of the water flow system.

Figure 8:
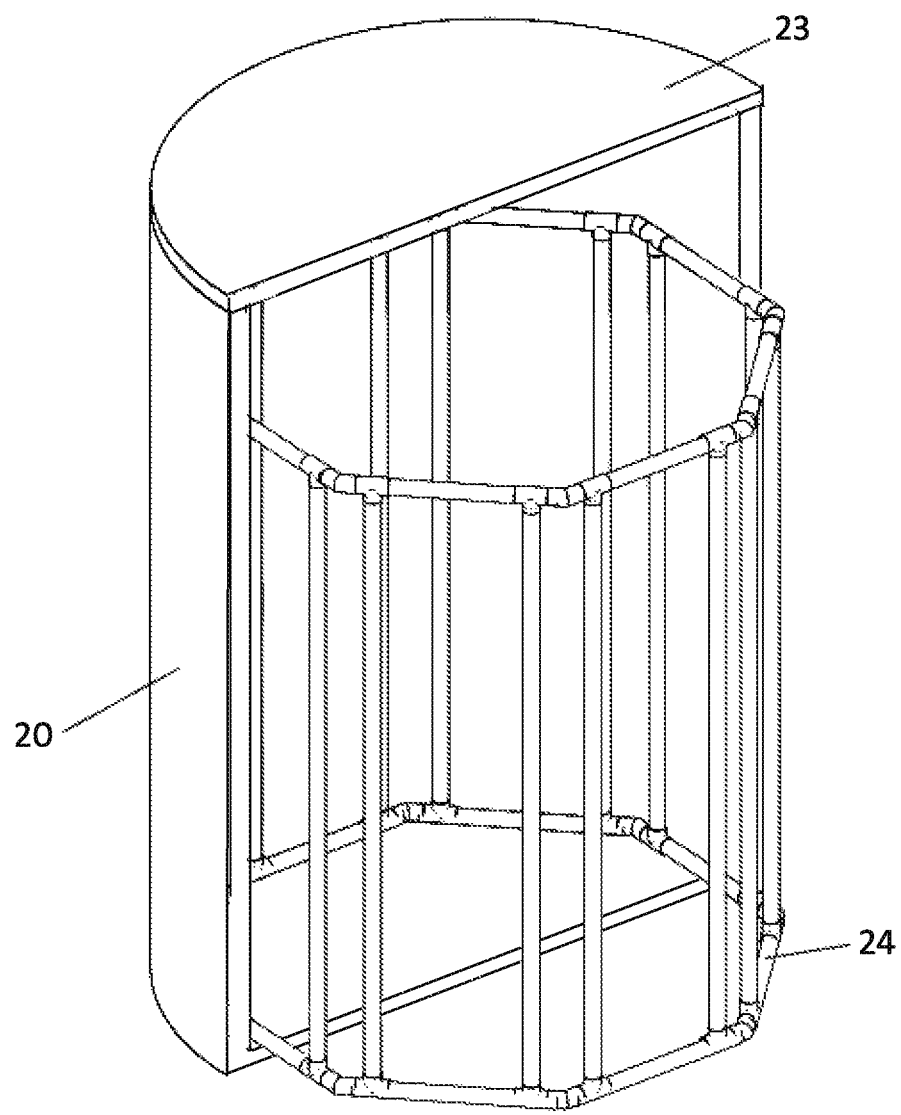
FIG. 8 is a view of the algae turf plate assembly/tank wall support frame assembly inserted in a tank with the tank shown in cross section.

FIG. 8 is a view of the assembly support frame 24 as it would be placed in a tank 20 with tank lid 23 in place.

Figure 9:
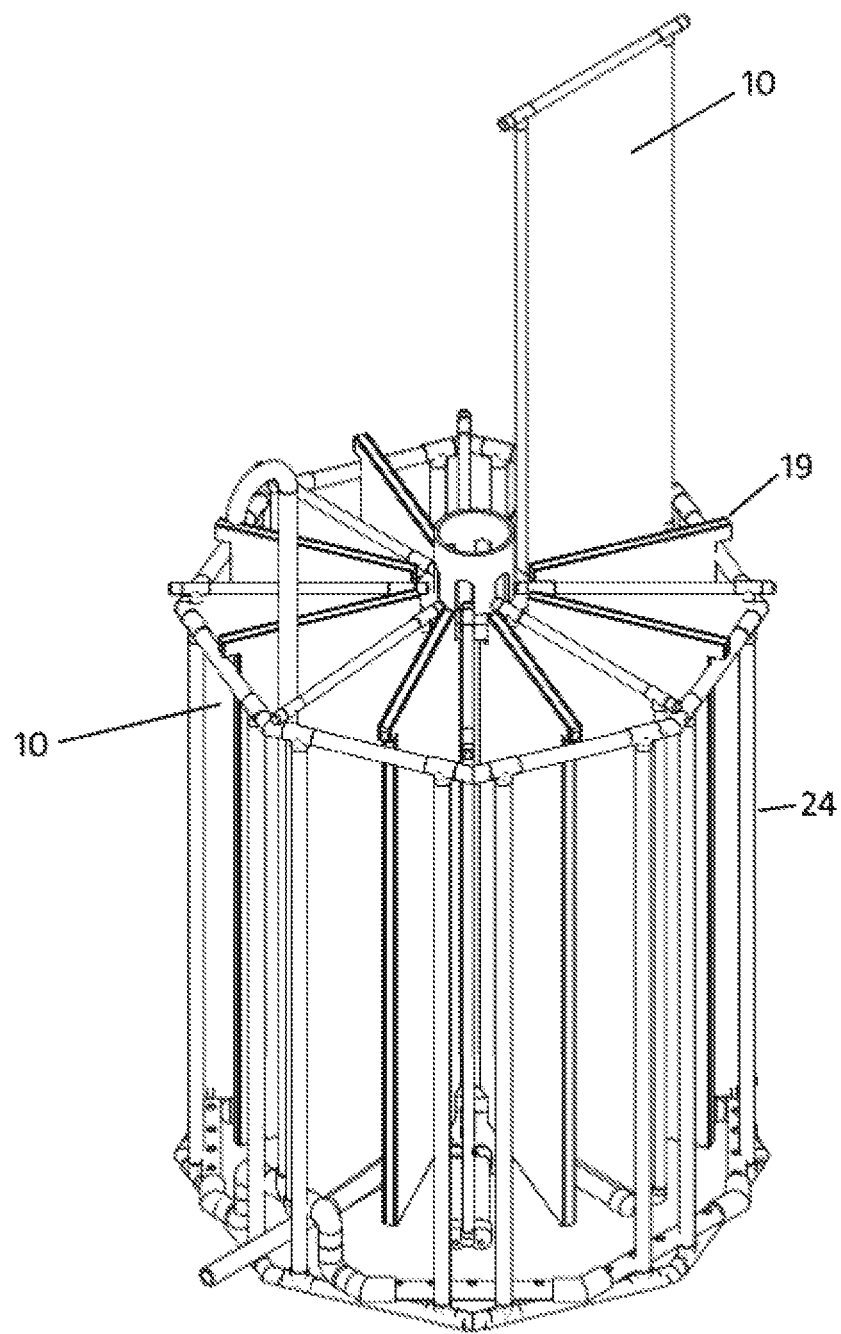
FIG. 9 is a side perspective view of a frame embodiment with lighting plates and algae turf plates arranged in an alternating pattern with each plate extending radially from a central support with an algae turf plate being removed or inserted.

FIG. 9 illustrates the frame assembly of FIG. 5 with an algae turf plate 10 being removed by lifting it upward.

Figure 10:
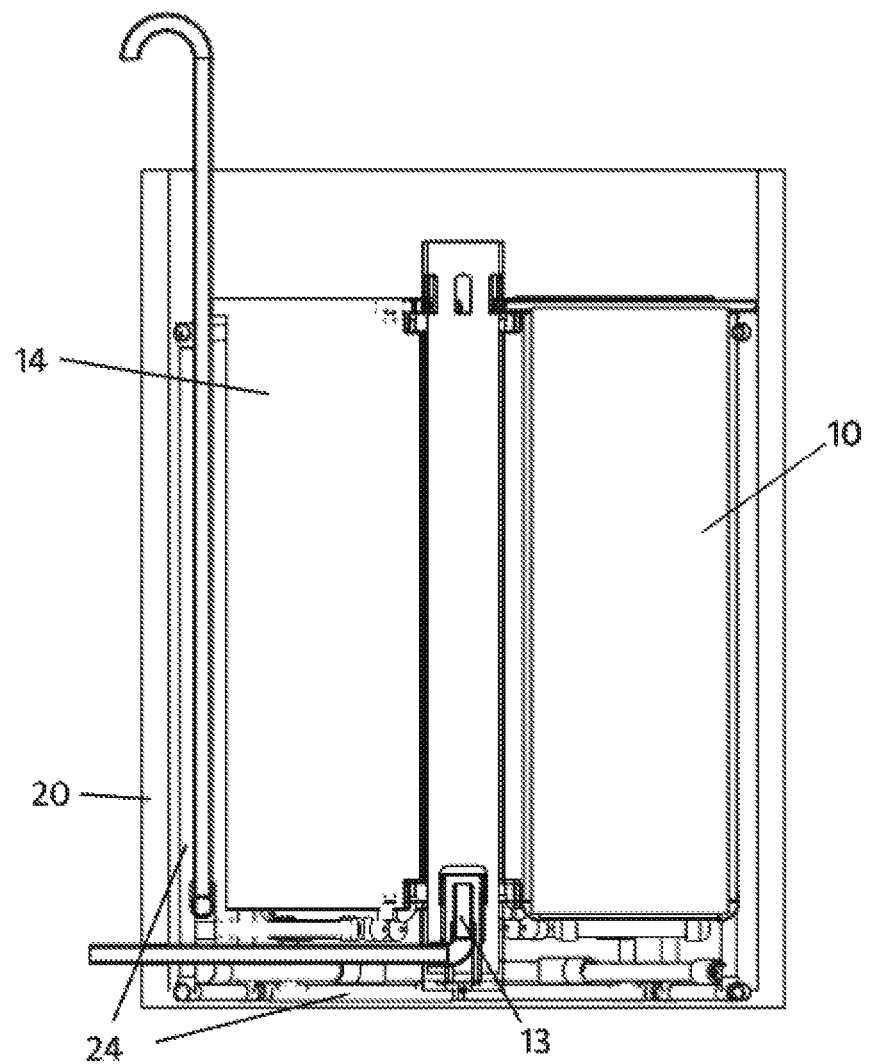
FIG. 10 is a side perspective view of a frame embodiment with lighting plates and algae turf plates arranged in an alternating pattern with each plate extending radially from a central support.

FIG. 10 is a cross-sectional view of a tank 20, assembly support frame 24, discharge bell siphon assembly 13, lighting-panels 14, and algae turf plates 10.

The LED panels 14 are made with a winding of high efficiency LEDs (in this case in rope lights) encased in epoxy and sandwiched between two thin acrylic glass sheets. These panels light the algae turf and work to direct the up flow of water over the algae turf plates 10. This construction with the LED/rope-light-as-lamp surrounded by epoxy also solves a few problems with lighting: 1: This construction eliminates several inches of acrylic plate thickness per lighting-panel needed if the lamp section were hollow. 2: The thinner construction significantly reduces the weight of the assembly. 3. Surrounding the LEDs with epoxy serves to make cheaper LEDs water proof.

FIG. 8 is a diagram showing the tank and assembly support frame. The frame works to anchor the lighting panels and algae turf plate frames and prevents the tank from collapsing due to the vacuum created inside the elevated position of the tank (which is located within a few inches of the crest of the line) by an enclosed system. This support frame eliminates the need for specially constructed tanks to withstand the negative pressure and allows for larger, standard cylindrical tanks to be used. The geometry of this design allows for a smaller footprint of the unit, while providing algae turf surface area sufficient to accomplish the purpose of the algae scrubber.

In certain embodiments, the assembly includes 8 LED plates 14 and 8 algae collection plates 13 yielding a total of 24 sq ft (1 plate being 1'×3'), and using both sides of the plate for a total of 54 sq. ft. of algae scrubber turf area in a tank that takes up approx. 7 sq. ft. and operates at a maximum electrical draw of 200 W, with the 8 illumination plates drawing 12 W each (approx. 100 W), 1 pump drawing 60 W.

The present invention, therefore, is well adapted to carry out the objectives and attain the ends and advantages mentioned, as well as others inherent therein. While the invention has been depicted and described and is defined by reference to particular embodiments of the invention, such references do not imply a limitation on the invention, and no such limitation is to be inferred. Consequently, the invention is intended to be limited only by the spirit and scope of the appended claims, giving full cognizance to equivalents in all respects.

What is claimed is:

1. An apparatus for the biological treatment of water using algae comprising a support frame for flat, two-sided LED lighting-panels and flat, two-sided algae turf plates, an axle, an intake pipe, a discharge pipe, and flat, two-sided LED lighting panels, wherein the flat, two-sided LED lighting panels emit light from each side, wherein the flat, two-sided LED lighting panels and flat algae turf plates are arranged as spokes radiating from the axle in an alternating panel so that each side of each two-sided lighting panel faces and illuminates a side of a flat algae turf plate, wherein the algae turf plates collect algae from the water, wherein the algae turf plates are removable from the support frame so that the collected algae can be removed from each side of each the algae turf plate.

2. The apparatus of claim 1 further including a tank within which the support frame is arranged.

3. A method of removing pollution from water comprising providing an apparatus according to claim 1, inserting algae turf plates in the support frame between each of the two-sided LED lighting panels, illuminating the LED lighting panels, and allowing the water to enter the intake pipe and exit the discharge pipe.

4. The method of claim 3 further including removing the algae turf plates, removing collected algae from the algae turf plates, and replacing the algae turf plates.

* * * * *